(12) United States Patent
Gapontsev et al.

(10) Patent No.: US 7,283,714 B1
(45) Date of Patent: Oct. 16, 2007

(54) LARGE MODE AREA FIBER FOR LOW-LOSS TRANSMISSION AND AMPLIFICATION OF SINGLE MODE LASERS

(75) Inventors: Valentin P. Gapontsev, Worcester, MA (US); Mikhail Vyatkin, Moscow (RU); Vladimir Grigoriev, Moscow (RU)

(73) Assignee: IPG Photonics Corporation, Oxford, MA (US)

( * ) Notice: Subject to any disclaimer, the term of this patent is extended or adjusted under 35 U.S.C. 154(b) by 0 days.

(21) Appl. No.: 11/611,239

(22) Filed: Dec. 15, 2006

(51) Int. Cl.
*G02B 6/36* (2006.01)
*H01S 3/00* (2006.01)

(52) U.S. Cl. ............ 385/126; 385/123; 385/127; 385/141; 385/27; 385/28; 372/6; 359/341.1; 359/346

(58) Field of Classification Search ......... 385/123, 385/124, 126, 127, 128, 141, 27, 28; 372/6; 359/341.1, 346
See application file for complete search history.

(56) References Cited

U.S. PATENT DOCUMENTS

| | | | |
|---|---|---|---|
| 4,815,079 A | 3/1989 | Snitzer et al. ........... 372/6 |
| 7,050,686 B2 * | 5/2006 | Farroni et al. ........... 385/123 |
| 7,062,137 B2 * | 6/2006 | Farroni et al. ........... 385/123 |
| 7,116,887 B2 * | 10/2006 | Farroni et al. ........... 385/142 |
| 2002/0164137 A1 | 11/2002 | Johnson et al. ........ 385/125 |
| 2002/0176676 A1 | 11/2002 | Johnson et al. ........ 385/125 |
| 2004/0086245 A1 * | 5/2004 | Farroni et al. ........... 385/123 |
| 2004/0096172 A1 | 5/2004 | Bongrand et al. ...... 385/123 |
| 2004/0240816 A1 | 12/2004 | Oh et al. ................ 385/123 |
| 2005/0175059 A1 | 8/2005 | Leclair et al. .......... 372/102 |

\* cited by examiner

*Primary Examiner*—Brian M. Healy (57) ABSTRACT

A large mode area optical fiber includes a large diameter core (d1 up to 60 μm), and a first cladding (diameter d2) wherein the difference between refractive index (n1) in the core and the first cladding (n2) is very small ($\Delta n<0.002$), thus providing a very low numerical aperture core (NA1 between 0.02 and 0.06). The preferred ratio of d2/d1<2. The fiber further has a second cladding, preferably a layer of air holes, having a very low refractive index n3 as compared to the core and first cladding such that the first cladding has a relatively high numerical aperture (NA2>0.4) (n3 is preferably less than 1.3). The small change in refractive index between the core and inner cladding combined with a large change in refractive index between the first cladding and second cladding provides a significantly improved single mode holding waveguide.

34 Claims, 9 Drawing Sheets

LARGE MODE AREA FIBER FOR LOW-LOSS TRANSMISSION AND AMPLIFICATION OF SINGLE MODE LASERS

BACKGROUND OF THE INVENTION

1. Field of the Invention

The present invention relates generally to optical fiber design and more particularly an optical fiber having a very large mode field core.

2. Background of the Related Art

High-power single-mode fiber lasers having output power in the range of 1-50 kW are now coming into widespread use in the industrial fields of welding, high-speed cutting, brazing, and drilling. Fiber lasers have high wall plug power efficiency, and very good beam characteristics. The beam from fiber lasers can be focused to small spot sizes with long focal length lenses with consistent beam properties independent of power level or pulse duration. Ytterbium single-mode fiber lasers with an $M^2$ of 1.1 have continually increased in power to the multi-kW level, and can be focused to 10-15 µm spot diameters with perfect Gaussian distribution. Further increasing power will open up additional markets in the future.

However, a major limitation to the application of high-power fiber lasers in industrial applications is power loss due to non-linear effects as the beam propagates through the delivery fiber from the fiber laser source to the work area. In most instances, the high power beam generated at the laser source must travel through 10-50 meters of delivery fiber to the work area. It is through this delivery fiber that the system can experience significant power loss due to non-linear effects within the current delivery fiber designs.

All optical fibers experience some signal loss due to attenuation and non-linearities within the fiber itself. Minimizing the effect of these imperfections is critical to maximizing the output power of the laser. To attain higher output power, it is desirable to use optical fibers with a large effective mode area while maintaining single mode guidance. Due to the reduced optical intensities, such fibers effectively have lower non-linearities and a higher damage threshold, which makes them suitable for such applications as the amplification of intense pulses or for single frequency signals, for example.

Conventional single mode fibers can in theory be adapted to provide a large effective mode area. To obtain single-mode guidance despite a large mode area, the numerical aperture of the optical fiber must be decreased, i.e., the refractive index difference between the core and the cladding must be reduced. However, as the numerical aperture decreases the guidance of the fiber weakens and significant losses can arise from small imperfections of the fiber or from bending. Moreover, the fiber may no longer strictly propagate in single-mode, as some higher-order modes may also propagate with relatively small losses. To minimize multi-mode propagation and strengthen the guidance of the fiber, specially optimized refractive index profiles are used, which allow a somewhat better compromise between robust guidance and large mode area. Nevertheless, large mode area single mode fibers have typically been limited to an effective mode area of about 615 µm$^2$ (28 µm mode field diameter).

Large mode area fibers can also be created using photonic crystal fibers (PCFs). Photonic crystal fiber (PCF) (also called holey fiber or microstructure fiber) is an optical fiber, which derives its waveguide properties not from a spatially varying material composition, but from an arrangement of very tiny air holes, which extend longitudinally in a symmetric pattern through the whole length of fiber. Such air holes can be obtained by creating a fiber preform with holes made by stacking capillary tubes (stacked tube technique). Soft glasses and polymers also allow the fabrication of preforms for PCFs by extrusion. There is a great variety of hole arrangements, leading to PCFs with very different properties. A typical PCF has a regular array of hexagonally placed air holes surrounding a solid core, which supports guided modes in the solid core by providing a composite cladding consisting of regular air holes in a glass background, the air holes having a lower effective refractive index than that of the core. To reduce the number of guided modes, the state-of-the-art PCF designs employ small air holes with a hole-diameter-to-pitch ratio d/Λ of less than 0.1. In this regime, the PCF is very weakly guiding, leading to a high degree of environmental sensitivity. As a result, robust single-mode propagation in PCFs has also been limited to a MFD of approximately 28 µm, a level similar to that of conventional fiber, which is not surprising considering the similarity in the principle behind the two approaches.

More recent PCF designs have exploited a cladding formed not by a large number of smaller holes, but rather by a limited number of large air holes. The design comprises a solid core surrounded by a ring of very few large air holes with an equivalent hole-diameter-to pitch ratio, d/Λ, larger than 0.7. This large hole cladding PCF design has been demonstrated to provide effective mode areas of up to 1400 µm$^2$ (42 µm effective core diameter). This is about 2.5 times higher than for ordinary single-mode fibers or conventional small hole PCF's.

Despite the significant progress made in optical fiber design, further improvement is still required to fully take advantage of the very high power lasers (25 kW to 50 kW) currently available and even higher power designs being developed, as well as to improve telecommunications devices. While the emphasis hereinabove is concentrated on large mode field fibers for industrial fiber laser applications, there is also a need in the telecommunication industry for large mode field active fibers for use in fiber lasers and fiber amplifiers. The large mode area allows the active fiber to provide improved amplification over shorter lengths.

There is thus a defined need for single mode holding large mode area fibers that are less susceptible to damage and that are more efficient at propagating a single spatial mode.

SUMMARY OF THE INVENTION

The present invention provides an improved single mode holding, large mode area optical fiber.

The optical fiber of the present invention includes a large diameter core (up to 60 µm), and a first cladding wherein the difference between refractive index in the core and the first cladding is very small (Δn<0.002) (low contrast), thus providing a very low numerical aperture core (NA between 0.02 and 0.06). The fiber further has a second cladding, preferably a layer of air holes, having a very low refractive index as compared to the core and first cladding such that the first cladding has a relatively high numerical aperture (NA>0.4) (high contrast). The small change in refractive index between the core and inner cladding combined with a large change in refractive index between the first cladding and second cladding provides a significantly improved single mode holding waveguide for low loss transmission and amplification of single-mode high-power continuous wave and/or pulsed laser power.

An third cladding surrounds the second cladding and has a refractive index equal to or less than the refractive index of the first cladding, but larger than the refractive index of the secondary cladding. Additional external cladding layers provide protection for the fiber. The optical fiber is sheathed in a protective plastic jacket.

The unique arrangement of the large core and cladding layers provides improved leakage of higher order modes to maintain single mode propagation, while the high-contrast boundary effectively confines the fundamental mode in the core, even when the fiber is bent in a very tight radius. The large mode area of the core also improves coupling from the laser source. Such a configuration is highly desirable for high-power transmission fibers as well as fiber laser and telecommunication amplifier applications.

Accordingly, an object of the present invention is the provision for a large mode area optical fiber that can deliver high power.

Another object of the present invention is the provision for a large mode area fiber that can maintain single mode emission.

Yet, another object of the present invention is the provision for an optical fiber that can deliver 30-50 KW of peak power.

Yet, another object of the present invention is the provision for an optical fiber that can deliver 5-10 mJ to the work area.

Yet, another object of the present invention is the provision for an optical fiber that can carry emissions of about 970 to about 980 nm in wavelength.

Another object of the invention is the provision of an optical fiber that can be used in telecommunication system to provide improved amplification over shorter lengths of fiber.

Another object of the present invention is the provision for an optical fiber that has a tight bend radius and is therefore more manageable.

Yet, another object of the present invention is the provision for an optical fiber that has higher reliability because of lossless transmission.

Another object of the present invention is the provision for an optical fiber that has orders of magnitude single mode higher power than current state-of-the-art fibers.

Yet, another object of the present invention is the provision for an optical fiber that has orders of magnitude higher power delivered with diffraction-limited beam quality.

Another object of the present invention is the provision for an optical fiber that has improvements in orders of magnitude for length of high power single mode transmission cables over current state-of-the-art transmission cables.

Another object of the present invention is the provision for an optical fiber that enables the use of a more reliable and cost effective coupling due to a larger fiber effective mode area.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
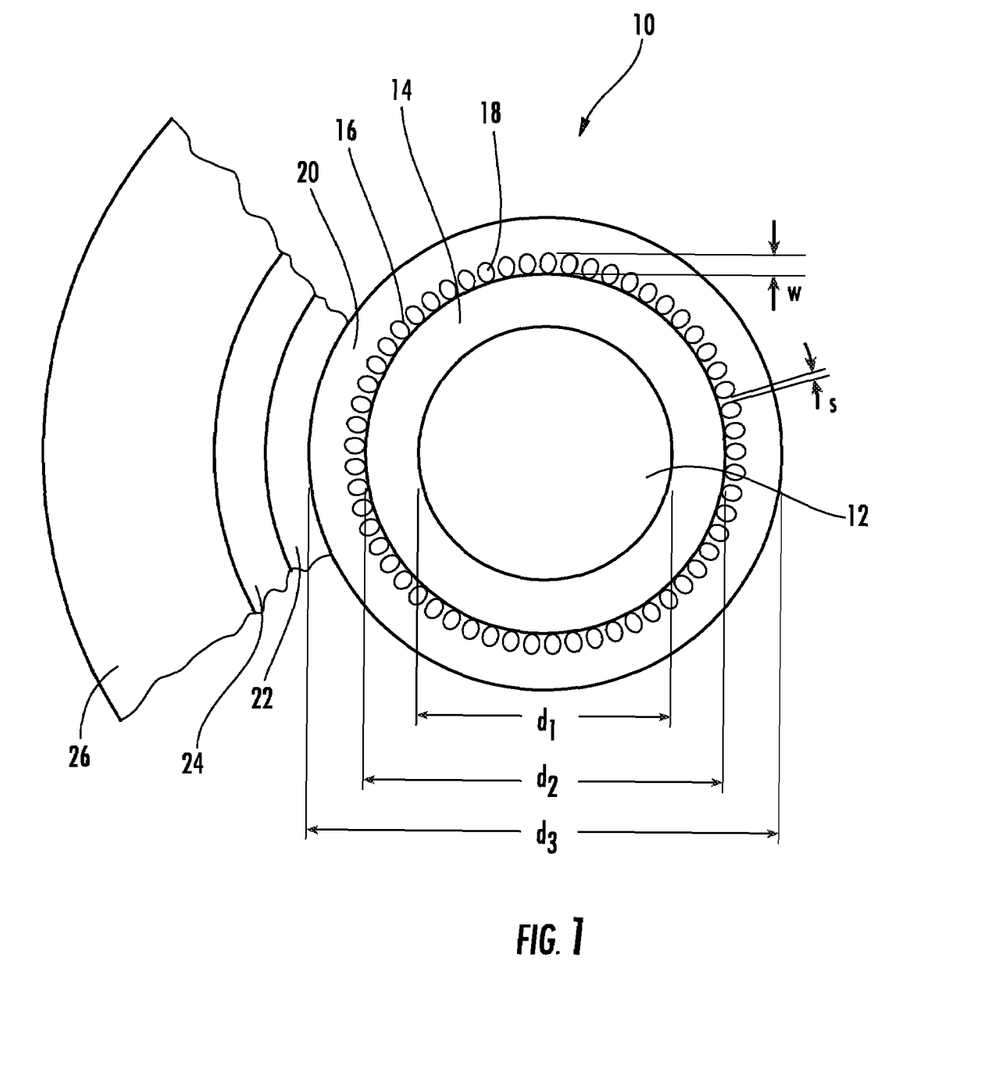
FIG. 1 is a cross-sectional view of the preferred embodiment of the optical fiber of the present invention.
Figure 2:
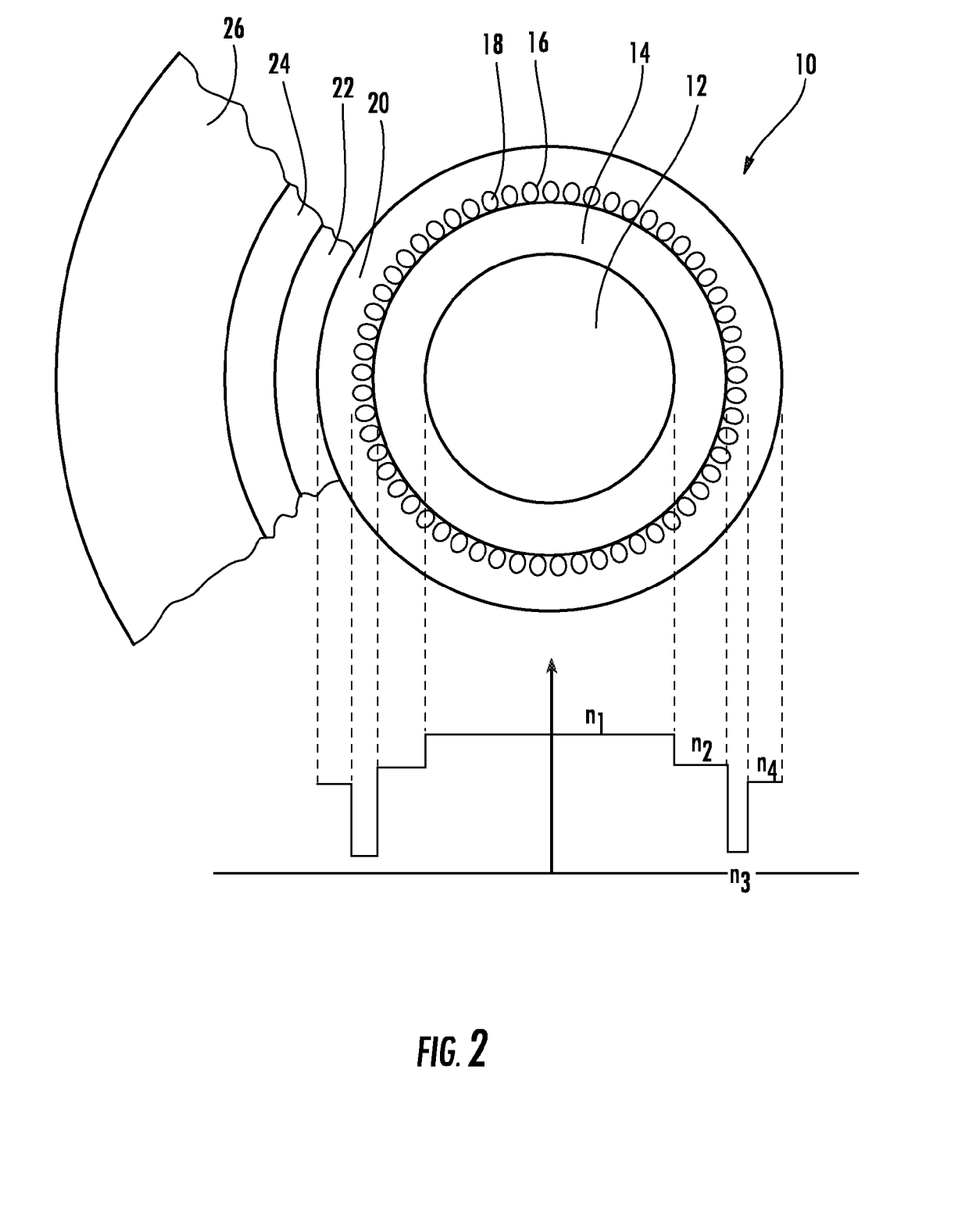
FIG. 2 is a cross-sectional view of the preferred embodiment juxtaposed with its refractive index profile.
Figure 3:
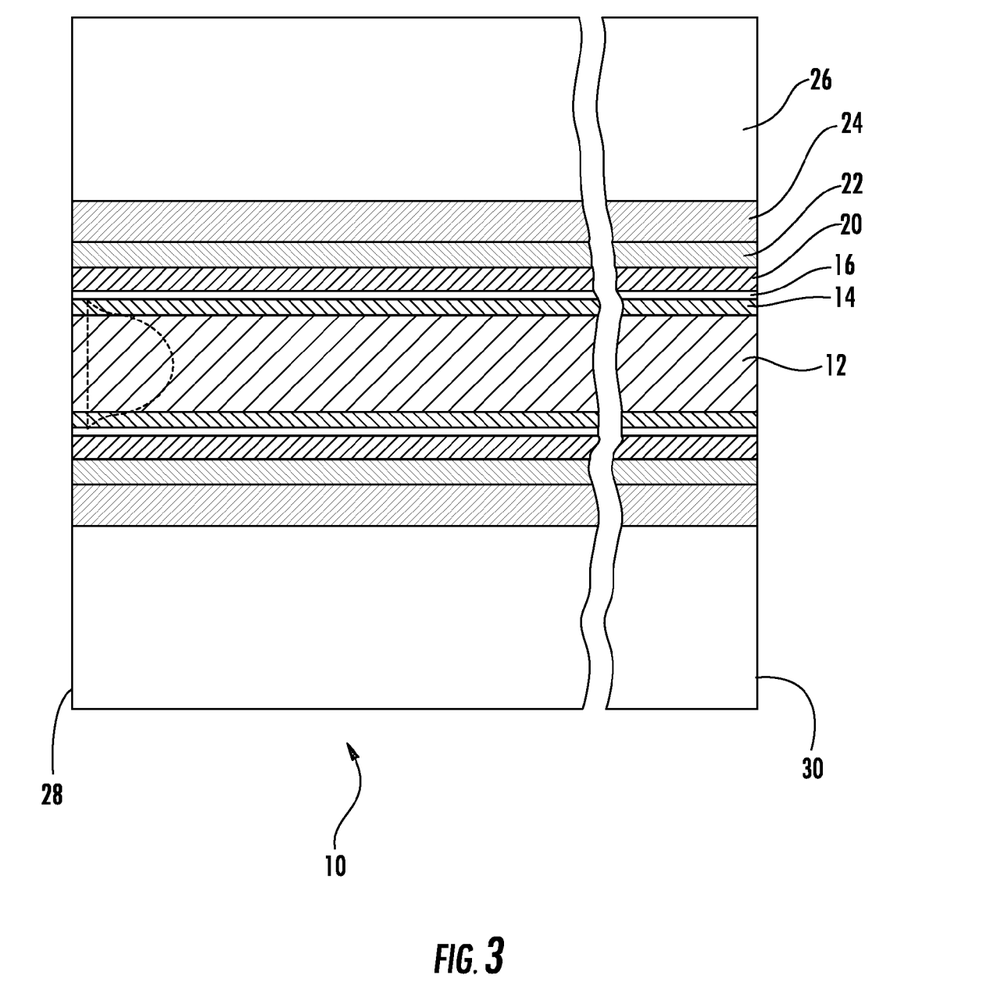
FIG. 3 is a longitudinal cross-sectional view thereof.

Referring to FIGS. 1-3, the preferred embodiment of the optical fiber of the present invention is illustrated and generally at 10.

As shown in its preferred embodiment, the fiber 10 comprises a photonic crystal fiber with an air hole cladding layer. In general, photonic crystal fibers with hole structures are known in the art. Photonic crystal fibers are generally constructed from undoped silica glass. As noted above, guiding is provided by spaced hole structures within the crystal structure of the fiber. Selected portions of the silica glass may contain doping to vary the refractive index.

More specifically, the optical fiber 10 of the present invention includes a large diameter core (up to 60 μm) 12, and a first cladding 14 wherein the difference between refractive index in the core 12 and the first cladding 14 is very small ($\Delta n<0.002$) (low contrast boundary), thus providing a very low numerical aperture core (NA between 0.02 and 0.06).

The fiber 10 further has a second cladding 16, preferably a layer of air holes 18, having a very low refractive index as compared to the core 12 and first cladding 14 (high contrast) such that the first cladding 14 has a relatively high numerical aperture (NA>0.4). The small change in refractive index between the core 12 and first cladding 14 combined with a large change in refractive index between the first cladding 14 and second cladding 16 provides a significantly improved single mode holding waveguide for low loss transmission and amplification of single-mode high-power continuous wave and/or pulsed laser power.

As shown in FIG. 1, the large mode field core 12 has a diameter $d_1$ and the first cladding 14 has a diameter $d_2$, wherein the ratio of the diameter of the large mode field core to that of the first cladding is effectively less than 2 and more preferably between about 1.3 and about 1.6. Specifically, the fiber 10 of the present invention can be constructed with a core diameter $d_1$ of preferably between about 20 μm and 60 μm. By providing an effective core diameter of up to 60 μm, a mode field area of up to 2800 μm$^2$ may be provided. This is a factor of 2 times better than fibers of the prior art. In the embodiment as illustrated, the core has a diameter of approximately 60 μm and the first cladding 14 has a diameter of approximately 110 μm.

The fiber 10 further preferably comprises a third cladding 20 having a diameter $d_3$, wherein the diameter $d_3$ is preferably at least 1.5 times the diameter $d_2$ ($d_3>1.5d_2$). In the embodiments as shown, cladding 20 is illustrated as having a diameter $d_3$ of approximately 1.5 times $d_2$. It is contemplated within the scope of the invention that $d_3$ could be as large as 5 times $d_2$. The illustrated embodiments are not drawn to scale and are not intended to limit the invention.

The fiber further includes a fourth cladding 22, a fifth cladding 24 and an outer protective jacket 26. The fourth and fifth claddings are optional and are only illustrated as an exemplary embodiment.

Referring to FIG. 2, the large mode area core 12 has an effective refractive index $n_1$. Preferably, the large mode area core 12 is formed from silica glass, which is slightly doped to raise the refractive index just above that of the first cladding 14. To obtain the desired refractive index $n_1$, the large mode area core 12 may be doped for example, with elements from the group comprising P, Ge, F, B, Y, or Al. Other dopants known in the art could be substituted depending on the desired characteristics or application the optical fiber 10 will be applied (for example, optimizing for a specific transmission wavelength $\lambda$).

As will be discussed later, the core 12 may also be doped with rare earth ions such as lanthanide elements like Yb, Nd, Er, Tm or Ho to provide active amplification in the fiber. Such active fibers would be highly effective for use in fiber lasers and amplifiers.

Turning back to FIG. 2, the first, or inner, cladding 14 has an effective refractive index $n_2$, which is just slightly lower than the refractive index $n_1$ of the large mode area core 12 to create an effective numerical aperture (NA1) of between about 0.02 and 0.06. In this regard, the first cladding 14 is also preferably formed of silica glass, which may also be doped to obtain the desired refractive index $n_2$ and numerical aperture (NA1) for the waveguide. The critical aspect of the invention is that the change ($\Delta$) in refractive index between the core 12 and the first cladding 14 be very small ($\Delta n<0.002$) to create a small numerical aperture. For example, undoped silica glass has a refractive index of about 1.450. If the first cladding is undoped silica, the core 12 would be slightly doped to raise the refractive index to about 1.451.

A second cladding layer 16 surrounds the first cladding layer 14. Preferably, the second cladding 16 is formed by a circular ring of coaxial channels 18 spaced uniformly around the first cladding 14 at a pitch s, each coaxial channel having a cross-sectional dimension W (as seen in FIG. 1). The pitch s is preferably selected to be less than two times the transmission wavelength $\lambda$. The cross-sectional dimension W is defined as the largest cross-sectional feature of the hole 18. Preferably the dimension W of the coaxial channels 18 is less than five times the transmission wavelength $\lambda$. In this case, the holes 18 are slightly oblong, and thus have one cross-sectional dimension greater than the other.

The coaxial channel cladding layer 16 has an effective refractive index $n_3$, which is much less than the refractive index $n_2$ of the inner cladding, and preferably $n_3$ is less than 1.3. By providing a low refractive index (high contrast) cladding structure, the numerical aperture (NA2) of first cladding 14 is effectively greater than 0.4. As mentioned earlier, it is preferred that the coaxial channels 18 are filled with air, however, other gasses may be used. The channels 18 may also be formed so as to have a vacuum.

As can be seen in FIG. 3, this arrangement of cladding layers around a large mode area core defines a waveguide wherein the fundamental mode field of the light emission is substantially confined to the large mode area core.

The third cladding layer 20 has a refractive index $n_4$ wherein $n_4>n_3$. In the context of a photonic crystal fiber, the third cladding 20 is also preferably a silica glass. Preferably, the thickness of the third cladding 20 is about 10-30 µm, although the exact thickness will depend on the material used and the desired fiber characteristics, and further must conform to the desired diameter characteristic $d_3>1.5\ d_2$, as discussed hereinabove.

Surrounding the third cladding layer 20 are several other cladding layers 22, 24 to minimize multimode propagation, outside interference, and provide support and protection for the optical fiber 10. Protective jacket 26 surrounds the fiber and provides mechanical strength and protection to the optical fiber of the present invention. The jacket 26 will generally have a thickness of approximately 100 µm. Cladding layers 22, 24 and the jacket 26 comprise conventional cladding materials, which are well known in the art, and the selection of materials and dimensions for these layers is not considered to be critical to the invention outside of the given parameters stated above.

Still referring to FIG. 3, the optical fiber of the present invention includes end facets 28, 30 located at each end of the optical fiber. The end facets 28, seal the open ends of the coaxial channels 18 and are preferably less then 100 µm in thickness.

Figure 4:
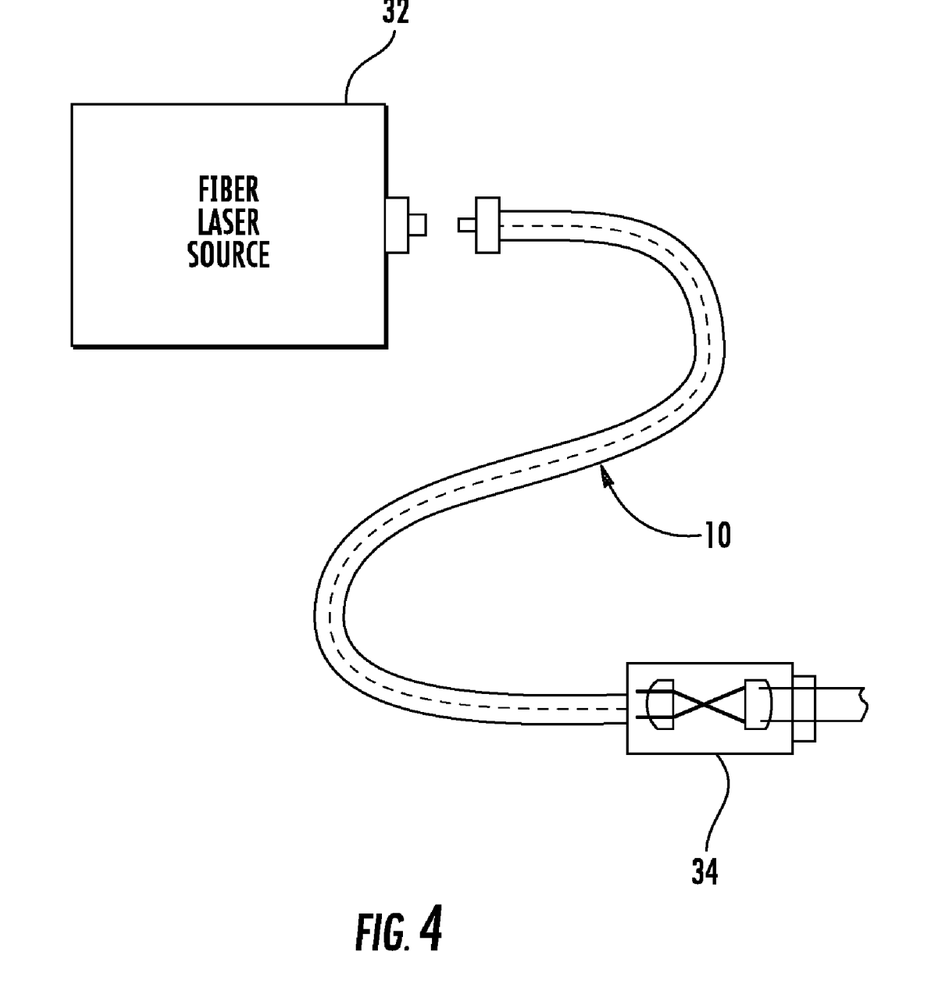
FIG. 4 is a schematic diagram of a laser cutting device including the preferred optical fiber as the delivery fiber from a fiber laser source to the work area.

Referring to FIG. 4, in industrial machining applications, the optical fiber of the present invention is used as a delivery fiber 10 with one end thereof coupled to a fiber laser source 32. A beam expander 34 is connected to the opposite end of the delivery fiber for focusing the emission at the worksite. The beam expander 34 is preferably a cylindrical, conical or multi-step cylindrical conical shaped piece of silica glass that lacks a core. The beam expander may also include an output facet, which may be flat or lensed as desired. The output facet may also be coated with an anti-reflective coating to prevent or reduce back-reflections of the emission thereby preventing possible damage to the fiber laser source.

Figure 5:
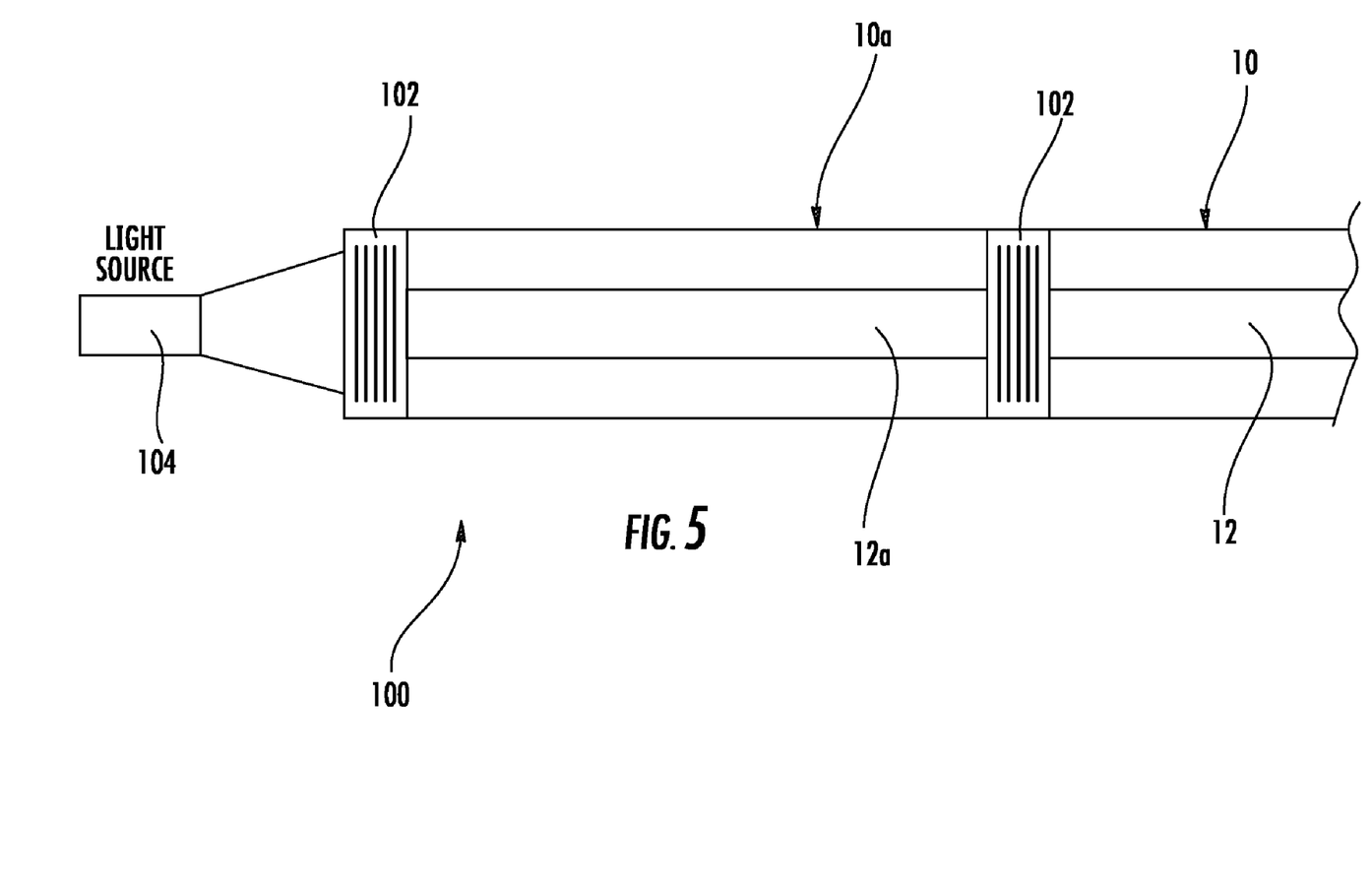
FIG. 5 is a schematic diagram of a fiber laser including the preferred optical fiber as the gain medium.
Figure 6:
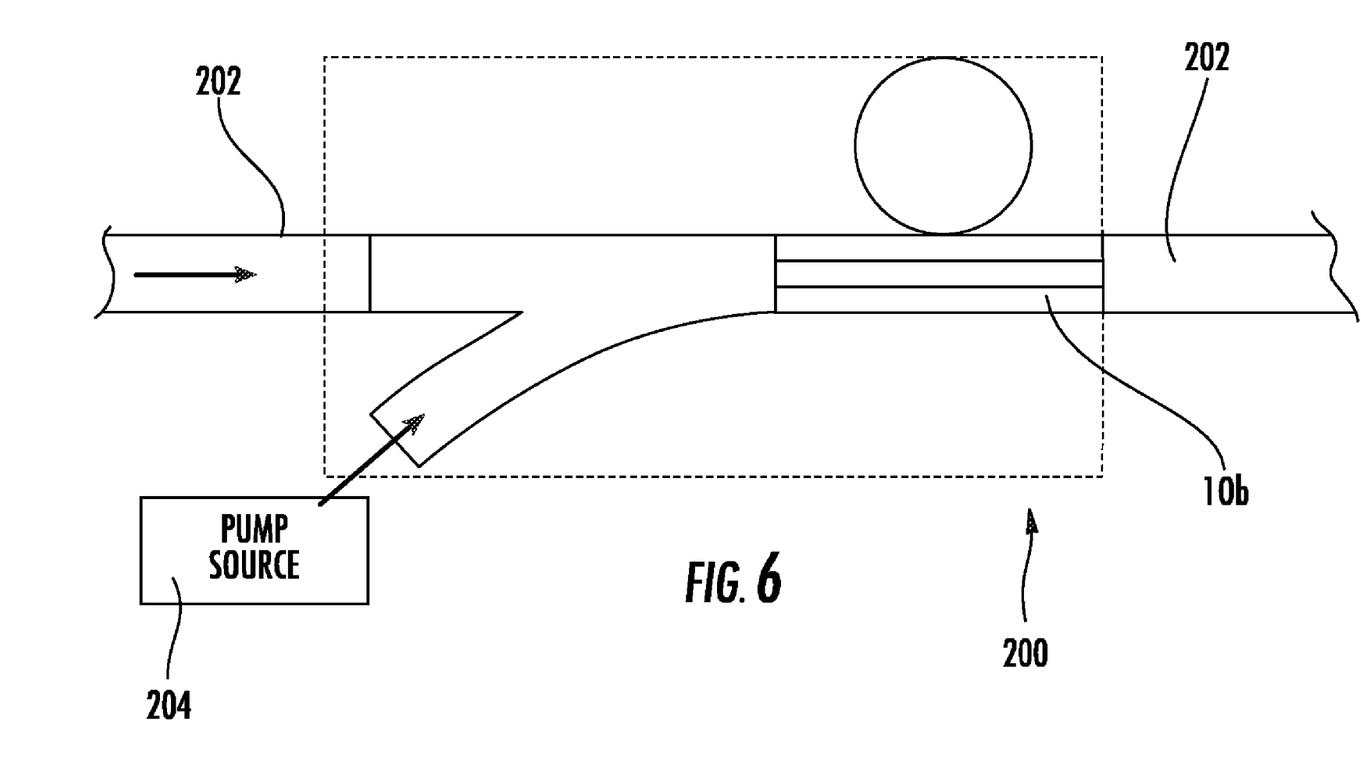
FIG. 6 is a schematic diagram of a fiber amplifier including the preferred optical fiber as the gain medium.

The optical fiber of the present could also be incorporated for use in a fiber laser assembly (as shown in FIG. 5) and/or in an amplifier assembly (as shown in FIG. 6).

Referring to FIG. 5, a fiber laser assembly 100 comprises an active fiber 10a in which the core 12a, which is doped with a rare earth ion, such as Ytterbium. Two reflective structures 102 are provided at opposing ends of the optical fiber 10a to define a lasing cavity therebetween. Typically, fiber Bragg gratings would be used for the reflective structures 102. Coupled to an input end of the optical fiber 10a, is a pump light source 104 (multimode or single mode) having a wavelength $\lambda$ corresponding to the absorption spectrum of the dopant, e.g. ytterbium, used to dope the core 12a of the optical fiber 10a.

Referring to FIG. 6, an amplifier assembly 200 comprises an active fiber 10b, which is doped with a rare earth ion, such as erbium (Erbium Doped Fiber Amplifier). A transmission fiber 202 is coupled to the input and output ends of the optical fiber 10b. Transmission fiber 202 carries a transmission signal having a wavelength $\lambda_t$. Coupled to the optical fiber 10b, is a pump light source 204 having a wavelength $\lambda_p$ corresponding to the absorption spectrum of the core dopant, e.g. erbium. As is well known in the art, the pump light excites the dopant and causes it to emit light in the same wavelength range as the transmission signal thereby boosting or amplifying the transmission light signal.

Figure 7:
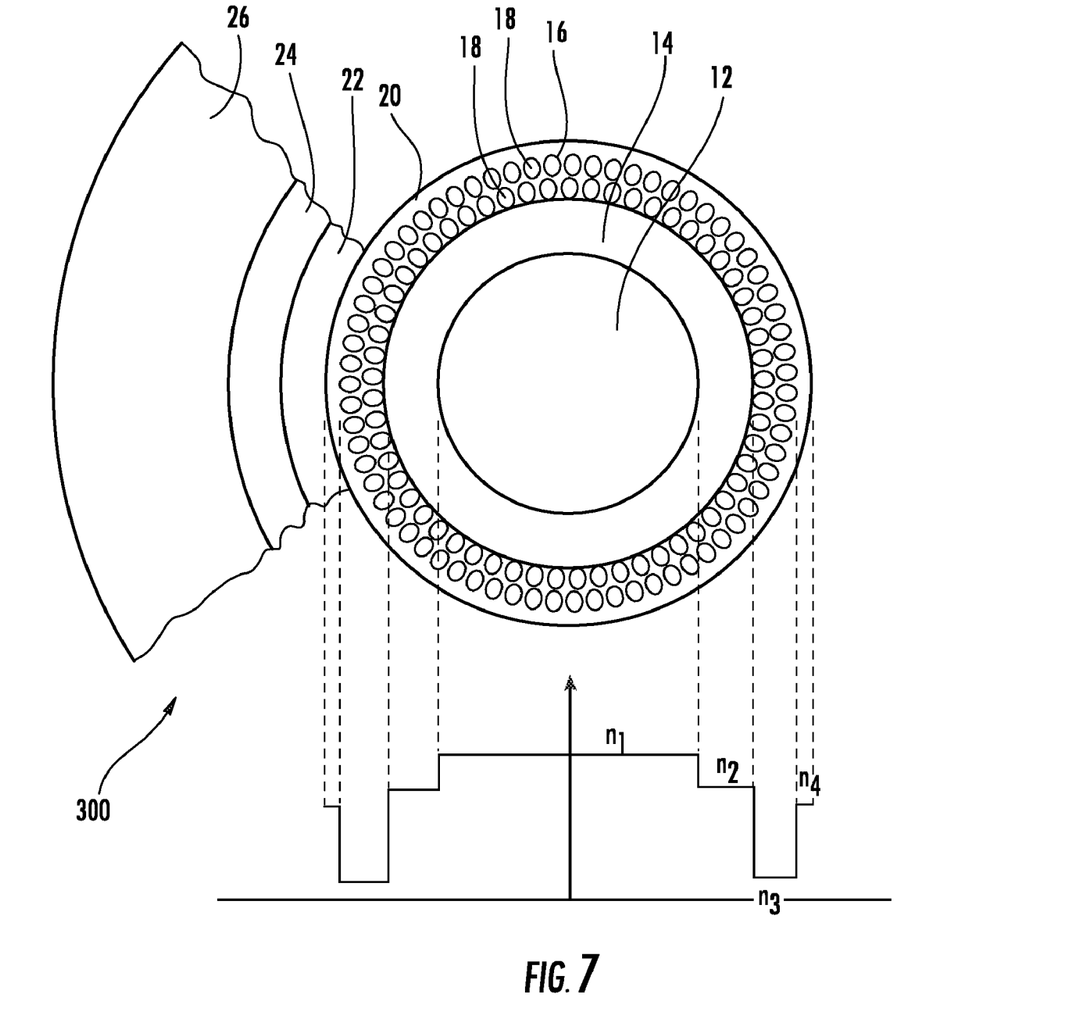
FIG. 7 is a cross-sectional view of a second embodiment of the optical fiber of the present invention having a dual layer of air holes.

Referring to FIG. 7, a second embodiment of the optical fiber of the present invention is shown generally at 300. The second embodiment is essentially identical to the first embodiment 10 with the exception that the second cladding layer 16 comprises two concentric rings of coaxial channels 18.

Figure 8:
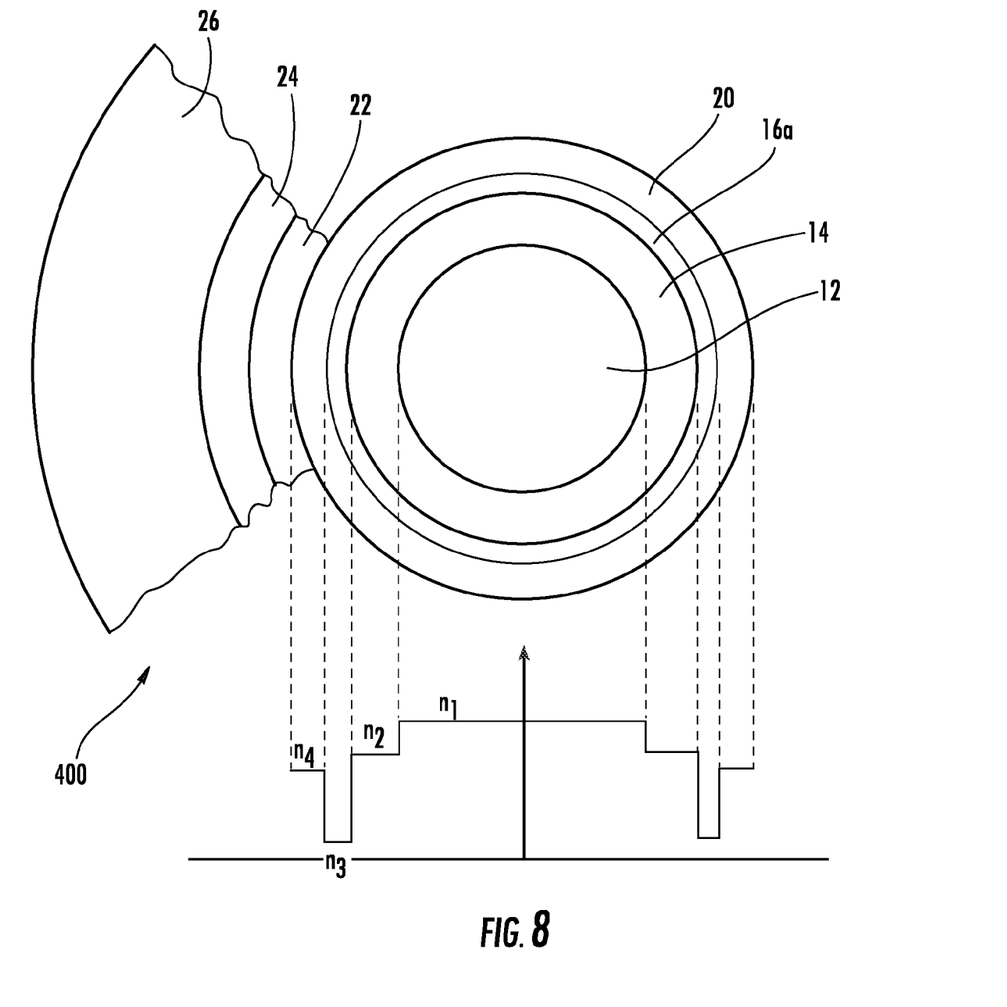
FIG. 8 is a cross-sectional view of a third embodiment having a very low refractive index material.

It is noted here that the preferred embodiments of the invention are constructed as photonic crystal fibers that provide a high-contrast coaxial air channel layer having a very low index of refraction. As mentioned above, it is the relative proportions of the refractive index between the core and first cladding, first cladding and second cladding, and second cladding and third cladding that provide the present fiber with its unique characteristics. In this regard, the Applicant contemplates that a fiber with similar operational characteristics can be formed using a conventional second cladding layer 16 formed from a solid material, but having a very low index of refraction. In this regard, an alternative embodiment of the invention is indicated at 400 in FIG. 8 having a second cladding layer shown as a solid layer 16a. Such a fiber could be formed from a silica glass or other polymer materials. In all other respects, the third embodiment has the same dimensional and operational characteristics as the preferred embodiment.

Figure 9:
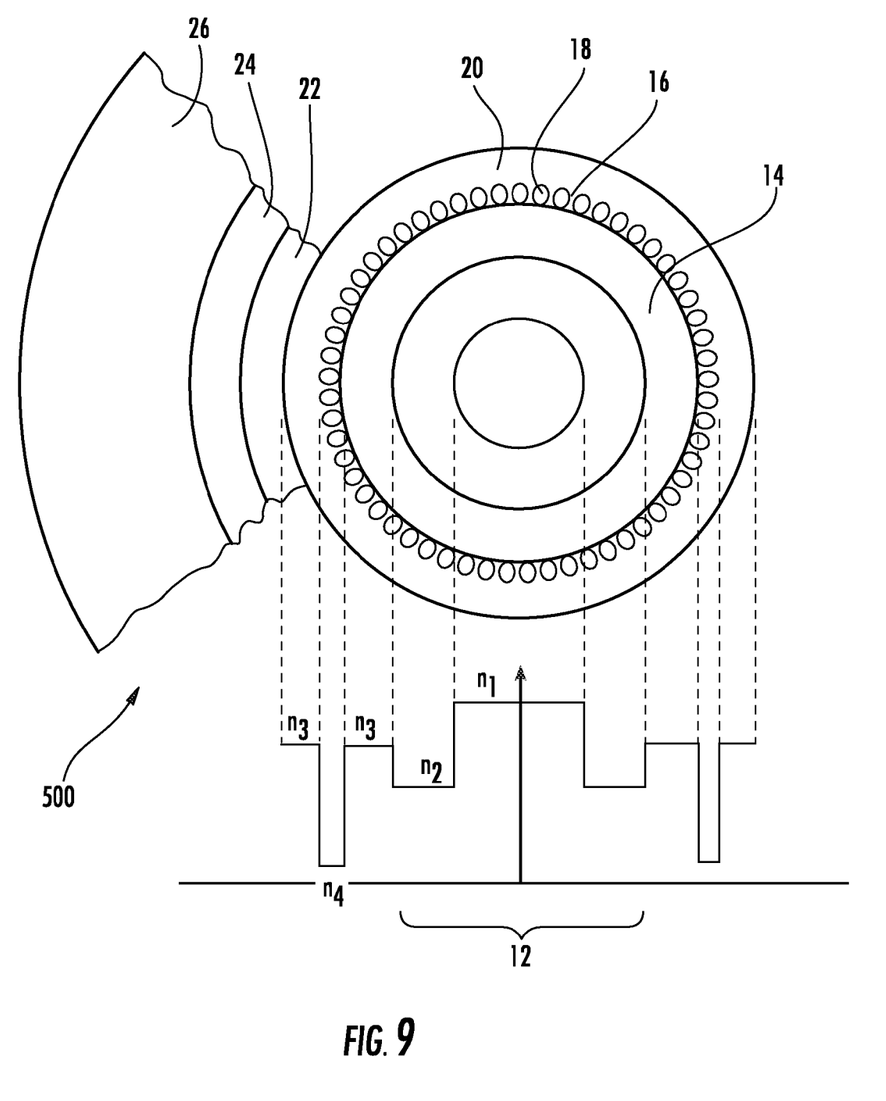
FIG. 9 is a cross-sectional view of a fourth embodiment of the optical fiber of the present invention with a core having a refractive index with a W-profile.

Referring to FIG. 9, a fourth embodiment of the optical fiber of the present invention is shown generally at 500. The fourth embodiment includes a large mode area core region 12, a first cladding 14 and a second cladding 16. The large mode area core region 12 has a refractive index step that creates a near W-shaped refractive index profile.

Therefore, it can be seen that the present invention provides a unique optical fiber construction that is particularly suited for high-power multi-kilowatt single mode fiber lasers, and multi-kilowatt power transmission fibers. The present fiber allows high-power, robust single mode propagation of light in a fiber waveguide, with little or no leakage even with a very tight bend radius. Among the many benefits provided by this fiber are an order of magnitude improvement of peak power with diffraction limited beam quality, an order of magnitude improvement in length of high-power single mode transmission cables, a more reliable, cost effective signal coupling due to the larger fiber effective area, a more manageable cable construction because of tighter bending radii and higher cable reliability because of low loss transmission.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A single mode holding, large mode area optical fiber for guiding light at an operating wavelength $\lambda$ comprising:
   a core having an effective mode field diameter d1 and an effective refractive index n1;
   a first cladding having an effective mode field diameter d2 and an effective refractive index n2, wherein
   n2<n1, and
   d2/d1<2,
   said core having an effective core numerical aperture NA1 between about 0.02 and about 0.06;
   a second cladding having an effective index of refraction n3, wherein
   n3<<n2, and
   said first cladding having an effective numerical aperture NA2 of greater than about 0.4; and
   a third cladding having an index of refraction n4, wherein n4>n3.

2. The fiber of claim 1 wherein d2/d1 is between about 1.3 and about 1.6.

3. The fiber of claim 1 wherein d1 is between about 20 μm and about 60 μm.

4. The fiber of claim 1 wherein said second cladding comprises at least one substantially circular layer of coaxial channels.

5. The fiber of claim 4 wherein said coaxial channels are filled with gas.

6. The fiber of claim 4 wherein said second cladding comprises two substantially circular concentric layers of coaxial channels.

7. The fiber of claim 6 wherein said coaxial channels are filled with gas.

8. The fiber of claim 4 wherein said channels have a largest cross-sectional dimension W,
   wherein W<5$\lambda$ and further wherein said channels are circumferentially spaced by a distance s,
   wherein s<2$\lambda$.

9. The fiber of claim 1 wherein said core, said first cladding and said third cladding comprise silica glass,
   said core being doped with elements from the group comprising: P, Ge, F, B, Y, Al and combinations thereof.

10. The fiber of claim 1 wherein said core is doped with a rare earth ion.

11. The fiber of claim 1 wherein said second cladding defines a boundary of a large mode area waveguide, said waveguide having a near step-index profile.

12. The fiber of claim 1 wherein said second cladding defines a boundary of a large mode area waveguide, said waveguide having a near W-shaped refractive index profile.

13. The fiber of claim 1 wherein n3<1.3.

14. The fiber of claim 1 wherein said third cladding has an effective mode field diameter d3, and further wherein d3>1.5d2.

15. The fiber of claim 4 having solid opposing end facets, said end facets having a thickness t<100 μm, said end facets closing said channels.

16. The fiber of claim 1 further comprising a silica glass beam expander spliced to an end face thereof.

17. The fiber of claim 16 wherein said beam expander has a shape selected from the group comprising: cylindrical, conical, multi-step cylindrical, or multi-step conical.

18. The fiber of claim 16 wherein said beam expander includes a lensed output facet.

19. A fiber laser comprising:
   a single mode holding, large mode area optical fiber for guiding light at an operating wavelength $\lambda$, said fiber comprising
      a core having an effective mode field diameter d1 and an effective refractive index n1, said core being doped with a rare earth ion,
      a first cladding having an effective mode field diameter d2 and an effective refractive index n2, wherein
      n2<n1, and
      d2/d1<2,
      said core having an effective core numerical aperture NA1 between about 0.02 and about 0.06,
      a second cladding having an effective index of refraction n3, wherein
      n3<n2, and
      said first cladding having an effective numerical aperture NA2 of greater than about 0.4, and
      an third cladding having an index of refraction n4, wherein n4>n3,
   means for defining a lasing cavity; and
   a pump light source coupled to an input end of said large mode area optical fiber, said pump light source having an output wavelength corresponding to the absorption spectrum of said rare earth ion.

20. The fiber laser of claim 19 wherein d2/d1 is between about 1.3 and about 1.6.

21. The fiber laser of claim 19 wherein d1 is between about 20 μm and about 60 μm.

22. The fiber laser of claim 19 wherein said second cladding comprises at least one substantially circular layer of coaxial channels.

23. The fiber laser of claim 22 wherein said coaxial channels are filled with gas.

24. The fiber laser of claim 22 wherein said channels have a largest cross-sectional dimension W,
wherein W<5λ and further wherein said channels are circumferentially spaced by a distance s,
wherein s<2λ.

25. The fiber laser of claim 19 wherein n3<1.3.

26. The fiber laser of claim 19 wherein said third cladding has an effective mode field diameter d3, and further wherein d3>1.5d2.

27. A fiber amplifier for amplifying a transmission signal having a wavelength $\lambda_t$, comprising:
a single mode holding, large mode area optical fiber for guiding light at said transmission wavelength $\lambda_t$, said fiber comprising
a core having an effective mode field diameter d1 and an effective refractive index n1, said core being doped with a rare earth ion having an emission spectrum corresponding to said transmission wavelength $\lambda_t$,
a first cladding having an effective mode field diameter d2 and an effective refractive index n2, wherein n2<n1, and
d2/d1<2,
said core having an effective core numerical aperture NA1 between about 0.02 and about 0.06,
a second cladding having an effective index of refraction n3, wherein
n3<n2, and
said first cladding having an effective numerical aperture of greater than about 0.4, and
an third cladding having an index of refraction n4, wherein n4>n3; and
a pump light source coupled to said large mode area optical fiber, said pump light source having an output wavelength corresponding to the absorption spectrum of said rare earth ion.

28. The fiber amplifier of claim 27 wherein d2/d1 is between about 1.3 and about 1.6.

29. The fiber amplifier of claim 27 wherein d1 is between about 20 μm and about 60 μm.

30. The fiber amplifier of claim 27 wherein said second cladding comprises at least one substantially circular layer of coaxial channels.

31. The fiber amplifier of claim 30 wherein said coaxial channels are filled with gas.

32. The fiber amplifier of claim 30 wherein said channels have a largest cross-sectional dimension W,
wherein W<5λ and further wherein said channels are circumferentially spaced by a distance s,
wherein s<2λ.

33. The fiber amplifier of claim 27 wherein n3<1.3.

34. The fiber amplifier of claim 27 wherein said third cladding has an effective mode field diameter d3, and further wherein
d3>1.5d2.

* * * * *